US008355351B2

(12) United States Patent
Yang et al.

(10) Patent No.: US 8,355,351 B2
(45) Date of Patent: Jan. 15, 2013

(54) METHOD, APPARATUS AND SYSTEM FOR FORMING TIME DIVISION DUPLEX MULTI-INPUT MULTI-OUTPUT DOWNLINK BEAMS

(75) Inventors: Luxi Yang, Shenzhen (CN); Daofeng Xu, Shenzhen (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 367 days.

(21) Appl. No.: 12/825,065

(22) Filed: Jun. 28, 2010

(65) Prior Publication Data

US 2010/0265855 A1   Oct. 21, 2010

Related U.S. Application Data

(63) Continuation of application No. PCT/CN2008/073701, filed on Dec. 24, 2008.

(30) Foreign Application Priority Data

Dec. 28, 2007   (CN) .......................... 2007 1 0306383

(51) Int. Cl.
*H04J 3/00* (2006.01)
(52) U.S. Cl. ............. 370/280; 370/294; 455/73; 455/91
(58) Field of Classification Search .................. 370/280, 370/294; 375/267, 219; 455/73, 91
See application file for complete search history.

(56) References Cited

U.S. PATENT DOCUMENTS

| | | | |
|---|---|---|---|
| 2004/0136349 A1* | 7/2004 | Walton et al. | 370/338 |
| 2005/0095996 A1* | 5/2005 | Takano | 455/91 |
| 2005/0286663 A1 | 12/2005 | Poon | |
| 2006/0094373 A1* | 5/2006 | Hottinen | 455/73 |
| 2007/0058590 A1 | 3/2007 | Wang et al. | |
| 2007/0165738 A1* | 7/2007 | Barriac et al. | 375/267 |
| 2009/0296788 A1* | 12/2009 | Hottinen | 375/219 |

FOREIGN PATENT DOCUMENTS

| | | |
|---|---|---|
| CN | 1885735 A | 12/2006 |
| CN | 1973473 A | 5/2007 |
| CN | 101043298 A | 9/2007 |
| CN | 101047414 A | 10/2007 |
| WO | 2005/109677 A1 | 11/2005 |
| WO | 2006/018710 A1 | 2/2006 |

(Continued)

OTHER PUBLICATIONS

International Search Report issued in corresponding PCT Application No. PCT/CN2008/073701; mailed Apr. 9, 2009.

(Continued)

*Primary Examiner* — Albert T Chou

(74) *Attorney, Agent, or Firm* — Brinks Hofer Gilson & Lione

(57) ABSTRACT

A method, an apparatus, and a system for forming Time Division Duplex (TDD) Multi-Input Multi-Output (MIMO) downlink beams are disclosed herein. The method includes: generating a transmitting beam of a first data stream according to a Maximum Rate Transmission (MRT) criterion; and generating transmitting beams of other data streams except the first data stream, wherein the transmitting beams of other data streams are confined in a null space of the transmitting beam of the first data stream. Through the embodiments of the present invention, the Base Station obtains precise Partial Channel State Information by using only reciprocity without requiring feedback information, and thus the calculation is simplified and the rate of data streams is improved.

10 Claims, 3 Drawing Sheets

101
Generate a transmitting beam of a first data stream according to an MRT criterion 102
Generate transmitting beams of other data streams except the first data stream, wherein the transmitting beams of other data streams are confined in a null space of the transmitting beam of the first data stream

FOREIGN PATENT DOCUMENTS

| WO | WO 2006/018710 A1 | 2/2006 |
|---|---|---|
| WO | WO 2006/138555 A2 | 12/2006 |
| WO | 2007/050860 A1 | 5/2007 |
| WO | WO 2007/050860 A1 | 5/2007 |
| WO | 2009/089740 A1 | 7/2009 |

OTHER PUBLICATIONS

Van den Bos, A "The Multivariate Complex Normal Distribution—A Generalization" IEE Transactions on Information Theory. Mar. 1995:537-539.

Sälzer, Thomas et al. "On Spatial Covariance Matrices for Downlink Eigen-Beamforming in Multi-Carrier CDMA" ICASSP.2005:1133-1136.

Sharif, Masoud, et al. "On the Capacity of MIMO Broadcast Channels with Partial Side Information" IEEE Transactions on Information Theory. Feb. 2, 2005:506-522.

Tomcik, Jim. "MBTDD Wideband Mode Performance Report 2 Presentation" IEEE 802.20 Working Group on Mobile Broadband Wireless Access. Jan. 6, 2006:1-31.

Xu, Daofeng et al. "Feedback of Downlink Channel State Information Based on Superimposed Coding" IEE Communications Letters. Mar. 3, 2007: 240-242.

Office Action issued in corresponding Chinese Patent Application No. 200710306382.0, mailed Feb. 21, 2012.

Extended European Search Report issued in corresponding European Patent Application No. 08870619.7, mailed Dec. 2, 2011.

Written Opinion of the International Searching Authority issued in corresponding International Patent Application No. PCT/CN2008/073701, mailed Apr. 9, 2009.

International Search Report issued in corresponding International Patent Application No. PCT/CN2008/073701, mailed Apr. 9, 2009.

Written Opinion of the International Searching Authority issued in corresponding PCT Patent Application No. PCT/CN2008/073762, mailed Mar. 26, 2009.

International Search Report issued in corresponding International Patent Application No. PCT/CN2008/073762, mailed Mar. 26, 2009.

Chen et al., "Precoded FIR and Redundant V-BLAST Systems for Frequency-Selective MIMO Channels" IEEE Transaction on Signal Processing, vol. 55, No. 7, Jul. 2007.

Salzer et al., "On Spatial Covariance Matrices for Downlink Eigen-Beamforming in Multi-Carrier CDMA" IEEE ICASSP 2005.

Sharif et al., "On the Capacity of MIMO Broadcast Channels with Partial Side Information" IEEE Transactions on Information Theory. vol. 51, No. 2, Feb. 2005.

van den Bos, "The Multivariate Complex Normal Distribution—A Generalization" IEEE Transactions on Information Theory. vol. 41, No. 2, Mar. 1995.

Tomcik, "MBTDD Wideband Mode Performance Report 2 Presentation" IEEE 802.20 Working Group on Mobile Broadband Wireless Access. IEEE C802.20-05/89r1, Jan. 6, 2006.

Supplementary European Search Report issued in corresponding European Patent Application No. 08 87 0656; dated Jun. 27, 2012.

Office Action issued in corresponding Chinese Patent Application No. 200710306382.0, mailed Aug. 15, 2012.

* cited by examiner

METHOD, APPARATUS AND SYSTEM FOR FORMING TIME DIVISION DUPLEX MULTI-INPUT MULTI-OUTPUT DOWNLINK BEAMS

CROSS-REFERENCE TO RELATED APPLICATIONS

This patent document is a continuation of International Application No. PCT/CN2008/073701, filed on Dec. 24, 2008, which claims priority to Chinese Patent Application No. 200710306383.5, filed on Dec. 28, 2007, both of which are hereby incorporated by reference in their entireties.

TECHNICAL FIELD

The present disclosure relates to the field of Time Division Duplex (TDD) technologies, and in particular, to a method, an apparatus, and a system for forming TDD Multi-Input Multi-Output (MIMO) downlink beams.

BACKGROUND

Studies show that the MIMO technology improves the multiplexing gain and diversity gain of a communications system significantly. Based on a Bell-labs Layered Space Time (BLAST) technology (which is a time-space communications technology patented by Lucent Technologies Bell Labs), different transmitting antennas transmit different data streams. In this case, the system capacity increases in proportion to the order of the MIMO channel. Based on a space-time coding and single-beam forming technology, all antennas transmit the same data stream to improve transmission reliability. The maximum diversity gain is equal to the product of the number of the transmitting antennas and the number of receiving antennas. Nevertheless, depending on the specific requirements on the rate and reliability, the MIMO system may be designed to utilize both multiplexing gain and diversity gain, namely, achieve a tradeoff between multiplexing and diversity.

In a Frequency Division Duplex (FDD) system, downlink channels are hardly available, and the downlink beam formation vector is generally calculated by a mobile terminal, and is selected from a codebook of a limited length. The serial number of the best codeword selected is fed back by the mobile terminal to a Base Station (BS) through a low-rate feedback channel. Such a method is generally known as limited feedback precoding.

Unlike FDD, a Time Division Duplex (TDD) system is characterized by reciprocity between downlink channels and uplink channels because uplinks and downlinks use the same frequency resource. That is, a downlink channel gain may be obtained through estimation of the uplink channel gain. Based on such channel information, multiple precoding technologies may be adopted. For example, Singular Value Decomposition (SVD), Zero Forcing (ZF), Minimum Mean Square Error (MMSE), and Tomlinson-Harashima Precoding (THP). For a TDD MIMO system, the prerequisite of using the foregoing precoding technologies is that the mobile terminal needs to use all antennas to transmit signals, to enable the Base Station to obtain all information of the MIMO channel. However, due to power consumption of the power amplifier and complexity, currently the mobile terminal still uses a single antenna to upload signals although it can receive signals through multiple antennas. Therefore, by using the reciprocity, the Base Station obtains only Partial Channel State Information (PCSI) corresponding to one antenna of the mobile terminal. Evidently, the traditional precoding technology is not realizable on the basis of only such Partial Channel State Information. In this case, the precoding technology needs to be implemented on the basis of Partial Channel State Information and channel statistic information.

A precoding implementation method in the prior art is implemented in a TDD MIMO system through a Pseudo-Eigen Beam (PEB) forming technology. The conception of the precoding implementation method is to reconstruct a correlation matrix of the channel, and then select beams of multiple data streams through SVD. The reconstructed relevant matrixes are made up of three weighted parts: a correlation matrix which is made up of instantaneous Partial Channel State Information on the Base Station side and has a rank of 1; a long-term channel correlation matrix fed back by the mobile terminal; and long-term statistics of unitary spaces which are selected randomly on the Base Station side and include instantaneous Partial Channel State Information.

However, such a method involves feedback of long-term statistics from the mobile terminal, and requires SVD performed by the Base Station and the mobile terminal simultaneously in order to select the transmission mode. Meanwhile, the Base Station needs to maintain a random statistic, which is implemented through continuous Quadrature Right-triangle (QR) decompositions. Therefore, the implementation is rather complicated. Moreover, no best weight value is determined in the PEB forming technology, and an empiric weight value needs to be used in practice. Evidently, the PEB forming technology does not make full use of the precise Partial Channel State Information, and the corresponding data stream rate is not ensured.

SUMMARY

The embodiments disclosed herein provide a method, an apparatus, and a system for forming TDD MIMO downlink beams to simplify implementation.

An exemplary embodiment provides a method for forming TDD MIMO downlink beams, where the method includes:

generating a transmitting beam of a first data stream according to a Maximum Rate Transmission (MRT) criterion; and generating transmitting beams of other data streams except the first data stream, wherein the transmitting beams of other data streams are confined in a null space of the transmitting beam of the first data stream.

Accordingly, another exemplary embodiment provides a Base Station, where the Base Station includes:

a first-data stream transmitting beam generating unit, configured to generate a transmitting beam of a first data stream according to an MRT criterion; and an other-data stream transmitting beam generating unit, configured to generate transmitting beams of other data streams except the first data stream, wherein the transmitting beams of other data streams are confined in a null space of the transmitting beam of the first data stream.

Accordingly, another exemplary embodiment provides a communications system, including:

a Base Station, configured to generate a transmitting beam of a first data stream according to an MRT criterion, and generate transmitting beams of other data streams except the first data stream, wherein the transmitting beams of other data streams are confined in a null space of the transmitting beam of the first data stream; and a receiver, configured to receive the transmitting beam of the first data stream and the transmitting beams of other data streams except the first data stream from the Base Station.

BRIEF DESCRIPTION OF THE DRAWINGS

To make the technical solution in the present invention or in the prior art clearer, the following outlines the accompanying drawings for illustrating the embodiments of the present invention or the prior art. Apparently, the accompanying drawings outlined below are for the exemplary purpose only, and persons of ordinary skill in the art can derive other drawings from such accompanying drawings without creative effort.

DETAILED DESCRIPTION OF THE EMBODIMENTS

In the embodiments of the present invention, in order to make maximum use of the precise Partial Channel State Information obtained through reciprocity, the first beam is designed according to the MRT criterion, and other beams are confined in the null space of the first beam; in a statistic sense, the beams are selected on the basis of capacity maximization to minimize the interference caused by other beams to the first beam; and, in a statistic sense, the accomplishable rate of other beams is ensured. Therefore, the embodiments of the present invention involve simple calculation only, avoid complicated operations such as SVD, and avoid feedback of long-term statistics from the mobile terminal to the Base Station, thus simplifying the implementation.

The following detailed description is directed to the technical solution in the exemplary embodiments discussed herein with reference to the accompanying drawings. However, the embodiments described are only a part of, rather than all of, the embodiments of the disclosure presented herein. Additionally, all other embodiments, which can be derived by those skilled in the art from the embodiments given herein without any creative efforts, fall within the scope of the present disclosure.

In order to make the technical solution, objectives, and merits of the present disclosure clearer, the following further describes the embodiments of the present disclosure in detail with reference to accompanying drawings.

In an embodiment, the Base Station ensures the rate of other data streams in a statistic sense by making maximum use of the precise Partial Channel State Information without requiring feedback information. In order to ensure the rate brought by the precise Partial Channel State Information, the transmitting beams of other data streams are confined in a null space of Partial Channel State Information, namely, no interference exists between the data streams corresponding to the Partial Channel State Information.

Figure 1:
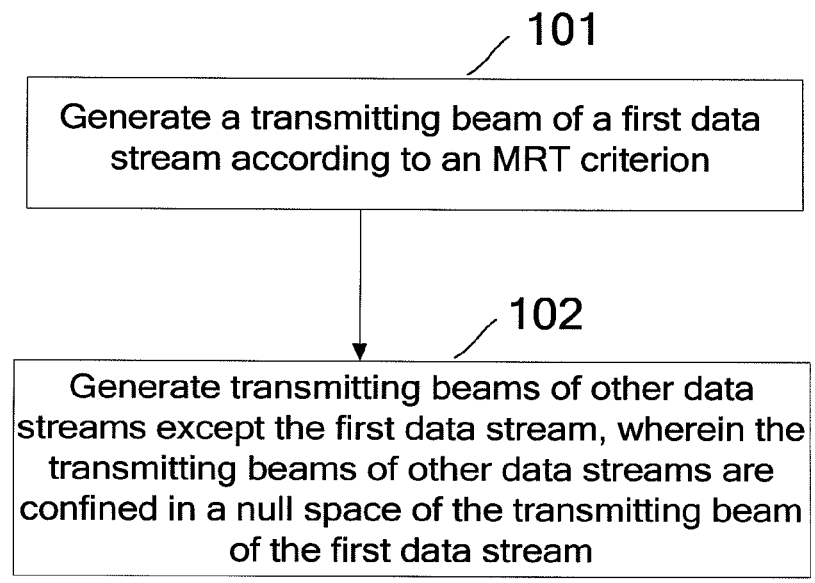
FIG. 1 is a flowchart of a method for generating TDD MIMO downlink beams in an embodiment of the present invention.

FIG. 1 is a flowchart of a method for generating Time Division Duplex Multi-Input Multi-Output (TDD MIMO) downlink beams in an embodiment of the present invention.

As shown in FIG. 1, the method includes the following steps:

Step 101: Generate a transmitting beam of a first data stream according to an MRT criterion.

Step 102: Generate transmitting beams of other data streams except the first data stream, wherein the transmitting beams of other data streams are confined in a null space of the transmitting beam of the first data stream.

Preferably, the first data stream corresponds to the transmitting antenna of the mobile terminal, and other data streams except the first data stream correspond to non-transmitting antennas of the mobile terminal. Moreover, the first data stream and other data streams except the first data stream may belong to the same code block or different code blocks. When the number of transmitting antennas of the mobile terminal is greater than 1, the data streams corresponding to all transmitting antennas of the mobile terminal are regarded as the first data stream. The transmitting beams of other data streams except the first data stream are generated, wherein the corresponding equivalent channel gain of other data streams is maximized in a statistic sense.

The calculation method involved in the embodiments of the present invention is elaborated below.

First, a system model provided in an embodiment of the present invention is described below. The following single-user MIMO system model is applicable.

It is assumed that the number of antennas of the Base Station is M, the number of antennas of the mobile terminal is N (without loss of generality, it is assumed that N=3), and M≧N. The mobile terminal receives data through all antennas, but uploads data through one of the antennas. According to channel reciprocity, the Base Station can obtain downlink channel information corresponding to the uploading antenna of the mobile terminal.

It is assumed that $N_S$ data streams are multiplexed simultaneously and delivered to the user. The data streams form a matrix (precoding matrix) W through one beam first, and are then transmitted out through all antennas. The corresponding baseband input-output relation may be described in the following way:

$$Y = \sqrt{\frac{E_s}{N_s}} HWS + n = \sqrt{\frac{E_s}{N_s}} \overline{H}S + n \qquad (1)$$

In the equation above, $E_S$ is the total transmitting power, n is additive white Gaussian noise, which obeys $N(0, \sigma_n^2)$; $\overline{H}$=HW. The precoding matrix fulfills the constraint trace $(WW^H)=N_S$, where Y is a received signal and S is a transmitted signal.

The correlation between MIMO channels is generally expressed by a Kronecker product as follows:

$$H = R_r^{1/2} H_w R_t^{1/2} \qquad (2)$$

In the equation above, $R_t$ is a transmitter-side correlation matrix of M×M, $R_r$ is a receiver-side correlation matrix of N×N, and $H_w$ is a space-independent MIMO channel of N×M. Generally it is assumed that every element of it obeys normal Gaussian distribution N(0 1).

Because a mobile terminal is generally located in an environment abundant in scatterers, the mobile terminal may be regarded as free of correlation; because few scatterers exist around a Base Station, the correlation of the Base Station is generally not ignorable.

Based on the analysis above, an actual MIMO system may be approximately represented by the following simplified correlation model:

$$H = H_w R_t^{1/2} = (h_1 \ h_2 \ldots h_N)^H. \quad (3)$$

In the equation above, $h_i$ is a channel vector between antenna i of the mobile terminal and multiple antennas of the Base Station.

$R_t$ is generally represented by the following correlation coefficient matrix approximately:

$$R_t = \begin{pmatrix} 1 & \rho & \cdots & \rho^{M-1} \\ \rho^* & 1 & \cdots & \rho^{M-2} \\ \vdots & \vdots & \ddots & \vdots \\ (\rho^*)^{M-1} & (\rho^*)^{M-2} & \cdots & 1 \end{pmatrix}. \quad (4)$$

In the equation above, $\rho$ is a correlation coefficient between neighboring antennas.

The correlation matrix between transmitting antennas above actually depends on the system carrier, arrangement of Base Station antennas, and distance between antennas. The correlation matrix may be obtained through Base Station-side calculation, or may be obtained by the mobile terminal through long-term statistics and fed back to the Base Station. In this embodiment, it is assumed that the correlation matrix determined by equation (4) can be obtained through Base Station-side long-term statistics on the transmitter side.

The beam formation calculation without feedback is described below:

Without loss of generality, it is assumed that the mobile terminal uploads data streams through the first antenna, namely, the Base Station can utilize reciprocity to obtain $h_1$. In order to make maximum use of the precise Partial Channel State Information, the first data stream is designed according to an MRT criterion, namely:

$$w_1 = h_1/\|h_1\|. \quad (5)$$

Because $H = (h_1 \ h_2 \ldots h_N)^H$, $W = [w_1 \ w_2 \ldots w_{N_S}]$, the equivalent channel matrix is:

$$\overline{H} = HW = \begin{pmatrix} \|h_1\| & h_1^H w_2 & \cdots & h_1^H w_{N_s} \\ h_2^H \frac{h_1}{\|h_1\|} & h_2^H w_2 & \cdots & h_2^H w_{N_s} \\ \vdots & \ddots & \cdots & \vdots \\ h_N^H \frac{h_1}{\|h_1\|} & h_N^H w_2 & \cdots & h_N^H w_{N_s} \end{pmatrix}, \quad (6)$$

where $W = [w_1 \ w_2 \ \cdots \ w_{N_s}]$.

In order to maximize the rate of the first data stream, the environment needs to be free of Inter Data stream Interference (ISI). That is, all elements except the first element in the first row of $\overline{H}$ are zeros.

Therefore, other beams may be designed to be confined within a null space of $h_1^H$, namely:

$$w_i \in \text{Null}(h_1^H), i=2, \ldots, N_S. \quad (7)$$

Under constraint of equation (7), the Signal to Noise Ratio (SNR) of the first channel is:

$$\gamma_1 = \frac{E_s}{N_s \sigma_n^2} \|h_1\|^2. \quad (8)$$

Equation (8) reveals that the SNR of the first channel is maximized if the mobile terminal selects the antenna of the maximum channel vector modulus value to upload data streams, namely:

$$\gamma_1 = \frac{E_s}{N_s \sigma_n^2} \max_{i=1,\ldots,N} \|h_i\|^2. \quad (9)$$

The selection of the remaining $N_S-1$ beams depends on statistic information only.

It is assumed that the null space of $h_1^H$ maybe formed through the columns of A, namely, span(A)=Null($h_1^H$), equation (7) is converted into:

$$w_i = A\xi_i, i=2, \ldots, N_S. \quad (10)$$

In the equation above, $\xi_i$ is a coordinate component of $w_i$ on A, and A makes up the null space matrix of $h_1^H$.

It is expected that the diagonal element of $\overline{H}$ is maximized to improve the accomplishable rate of the system. For lack of precise CSI, the foregoing object is maximized only in a statistic sense, namely:

$$\max_{\xi_i} E(w_i^H h_i h_i^H w_i) = w_i^H R w_i = \xi_i^H A^H R A \xi_i, \quad (11)$$

$$i = 2, \ldots, N_s.$$

Evidently, the best coordinate component $\xi_i$ is an eigenvector corresponding to the maximum eigenvalue of $A^H RA$.

If $N_S > 2$, $N_S - 1$ coordinate components may be the eigenvectors corresponding to $N_S - 1$ maximum eigenvalues of $A^H RA$. Such a beam selection method is similar to the traditional beam formation method.

Through an MMSE receiver, the mobile terminal may obtain an estimate of the transmitted signals:

$$\hat{S} = G^H Y \quad (12)$$

where $$G = R_Y^{-1} R_{YS} = \sqrt{\frac{N_s}{E_s}} \left[ HWW^H H^H + \frac{N_s}{E_s} \sigma_n^2 I \right]^{-1} HW.$$

In this case, the SNR of channel i is:

$$\gamma_i = \frac{1}{MSE_i} - 1 \quad (13)$$

$$= \frac{1}{\left[ I - W^H H^H \left( HWW^H H^H + \frac{N_s}{E_s} \sigma_n^2 I \right)^{-1} HW \right]_{ii}} - 1.$$

Therefore, when the receiver is an MMSE receiver, the precoding method disclosed herein can achieve the following system rate:

$$C_{sum} = \sum_{i=1}^{N_s} \log_2(1+\gamma_i). \tag{14}$$

Elaborated above is a calculation method of beam formation without feedback.

The foregoing embodiment deals with the scenario that the mobile terminal has two antennas. In fact, the embodiments of the present disclosure are applicable to the scenario that the mobile terminal has more than two antennas. In this case, the transmitting antennas of the mobile terminal can transmit signals in turn. The embodiments of the present disclosure are further applicable to the scenario that some antennas of the mobile terminal transmit signals but other antennas do not transmit signals in the case of uplink transmitting.

Figure 2:
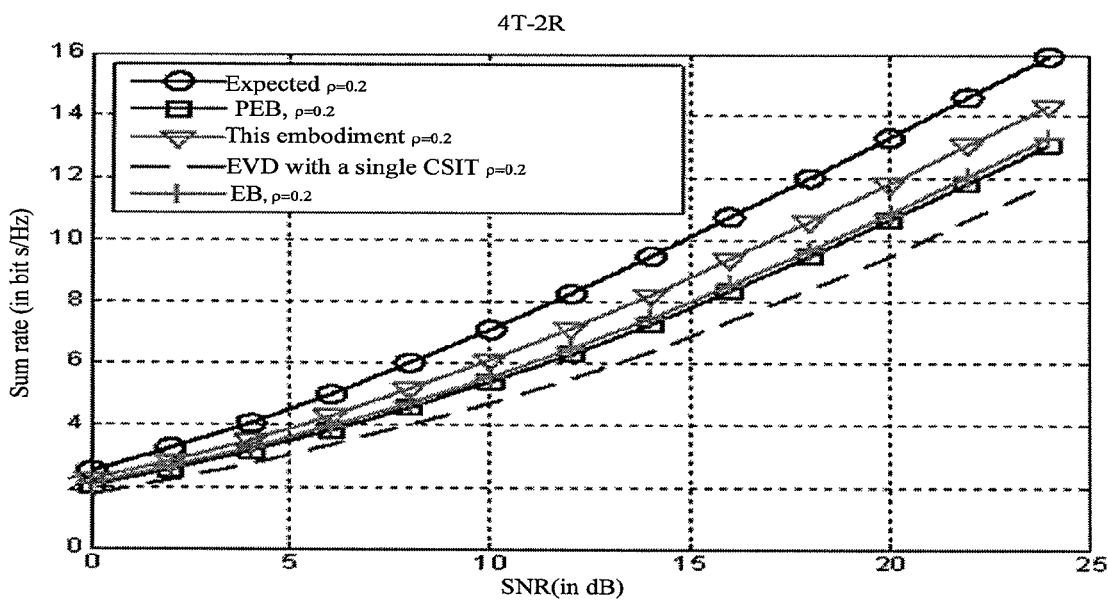
FIG. 2 shows emulated comparison of Signal-to-Noise Ratio (SNR) and sum rate in the case of ρ=0.2 without feedback in an embodiment of the present invention.
Figure 3:
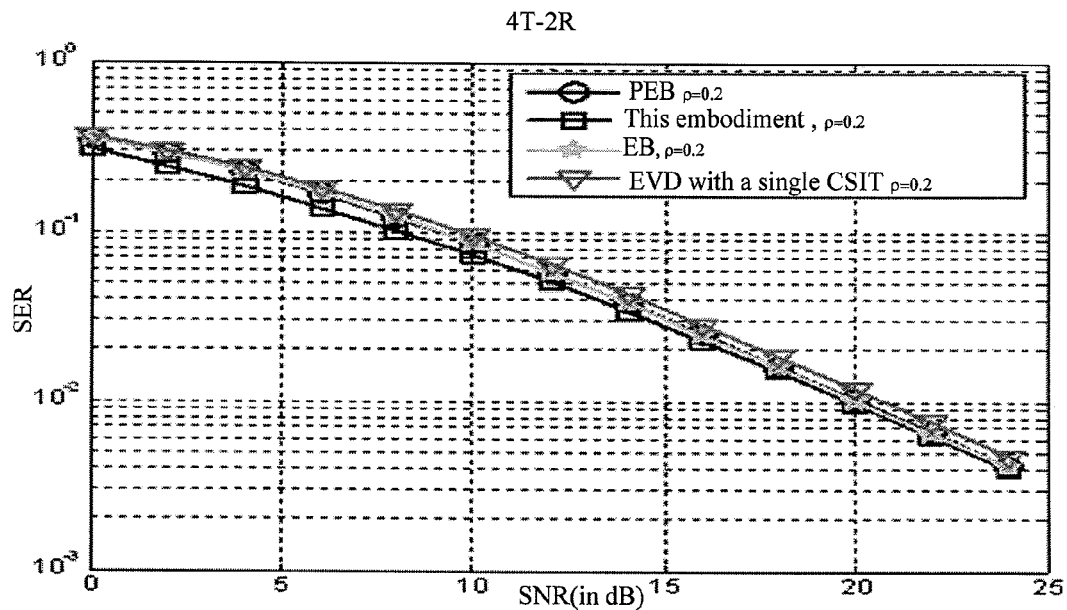
FIG. 3 shows emulated comparison of SNR and Symbol Error Rate (SER) in the case of ρ=0.2 without feedback in an embodiment of the present invention.
Figure 4:
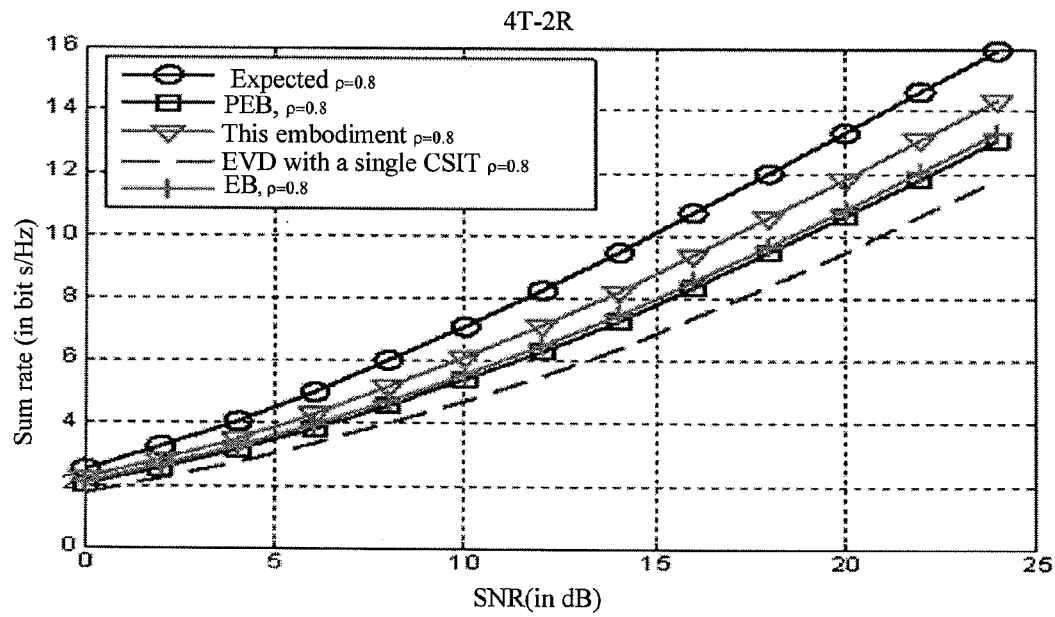
FIG. 4 shows emulated comparison of SNR and sum rate in the case of ρ=0.8 without feedback in an embodiment of the present invention.
Figure 5:
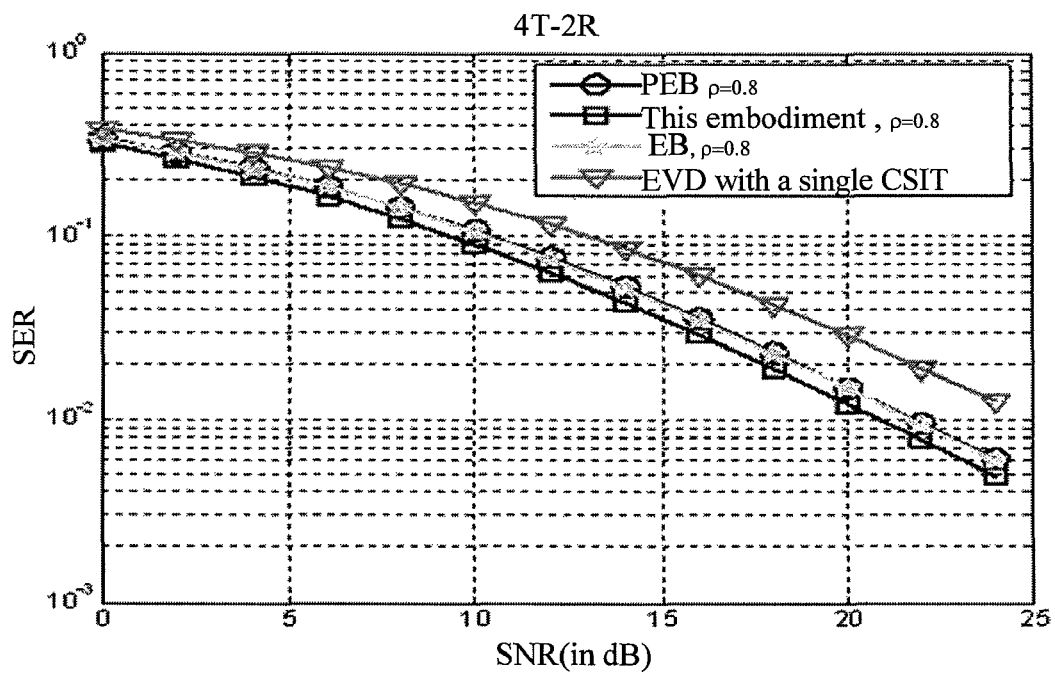
FIG. 5 shows emulated comparison of SNR and SER in the case of ρ=0.8 without feedback in an embodiment of the present invention.

FIG. 2 shows emulated comparison of SNR and sum rate in the case of ρ=0.2 without feedback in an embodiment of the present disclosure. FIG. 3 shows emulated comparison of SNR and SER in the case of ρ=0.2 without feedback in an embodiment of the present invention. FIG. 4 shows emulated comparison of SNR and sum rate in the case of ρ=0.8 without feedback in an embodiment of the present disclosure. FIG. 5 shows emulated comparison of SNR and SER in the case of ρ=0.8 without feedback in an embodiment of the present disclosure.

FIG. 2-FIG. 5 show emulated performance of the system without feedback. The emulation result reveals that: The calculation method disclosed herein increases the rate by 2 bits/Hz/s (ρ=0.2) or over 1 bit/Hz/s (ρ=0.8) compared with the Eigen Beam (EB) forming method and the PEB forming method. As expected, the PCSI-based EVD method provides the worst performance with respect to both accomplishable rate and SER because this method selects other beams randomly in the orthogonal space of the Partial Channel State Information and is not optimized. Besides, compared with EB forming and PEB forming, the method under the present disclosure brings SER gain of about 1 dB when the channel correlation coefficient is ρ=0.8. With decrease of the channel correlation coefficient, the gain of SER decreases. In an extreme scenario, the correlation coefficient is 0, namely, the antennas are independent of each other. The several methods mentioned above bring almost the same performance because the channel correlation matrix provides no useful information in that scenario.

A Base Station and a receiver are provided in an embodiment of the present disclosure.

Figure 6:
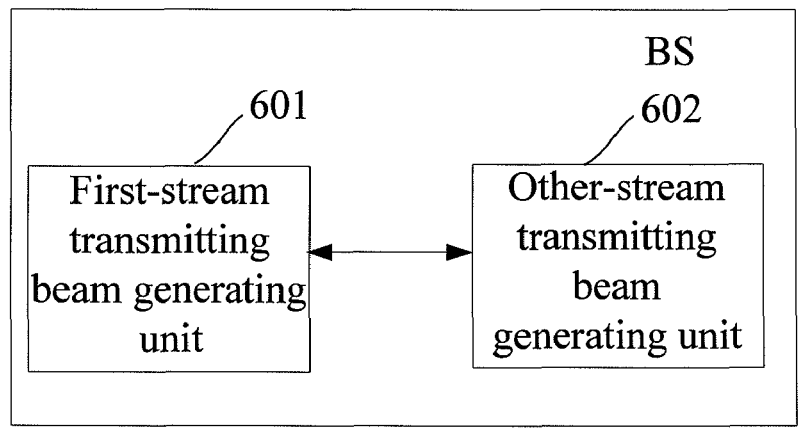
FIG. 6 shows a structure of a Base Station provided in an embodiment of the present invention.

FIG. 6 shows a structure of a Base Station provided in an embodiment of the present disclosure.

As shown in FIG. 6, the Base Station includes:

a first-data stream transmitting beam generating unit 601, configured to generate transmitting beam of a first data stream according to an MRT criterion; and an other-data stream transmitting beam generating unit 602, configured to generate transmitting beams of other data streams except the first data stream, wherein the transmitting beams of other data streams are confined in a null space of the transmitting beam of the first data stream.

Preferably, the other-data stream transmitting beam generating unit 602 generates transmitting beams of other data streams except the first data stream, and maximizes the equivalent channel gain corresponding to other data streams in a statistic sense, where the transmitting beams of other data streams are confined in a null space of the transmitting beam of the first data stream.

The receiver is configured to receive the transmitting beam of the first data stream and the transmitting beams of other data streams except the first data stream from the Base Station.

A TDD communications system is provided in an embodiment of the present invention.

Figure 7:
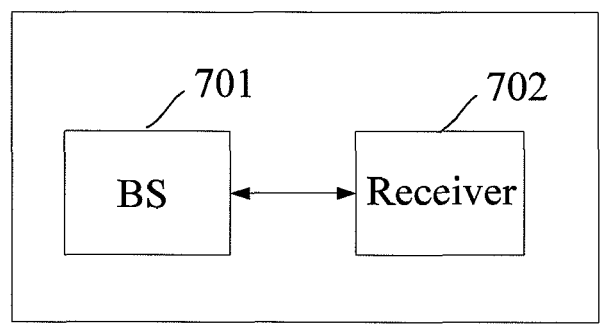
FIG. 7 shows a structure of a TDD communications system provided in an embodiment of the present invention.

FIG. 7 shows a structure of a TDD communications system provided in an embodiment.

As shown in FIG. 7, the system includes:

a Base Station 701, configured to: generate transmitting beam of a first data stream according to an MRT criterion, and generate transmitting beams of other data streams except the first data stream, wherein the transmitting beams of other data streams are confined in a null space of the transmitting beam of the first data stream; and a receiver 702, configured to receive the transmitting beam of the first data stream and the transmitting beams of other data streams except the first data stream.

Preferably, the receiver is an MMSE receiver.

Similarly, the Base Station 701 may include:

a first-data stream transmitting beam generating unit, configured to generate transmitting beam of a first data stream according to an MRT criterion; and an other-data stream transmitting beam generating unit, configured to generate transmitting beams of other data streams except the first data stream, wherein the transmitting beams of other data streams are confined in a null space of the transmitting beam of the first data stream.

Preferably, the first data stream corresponds to the transmitting antenna of the receiver, and other data streams except the first data stream correspond to non-transmitting antennas of the receiver. Moreover, the first data stream and other data streams except the first data stream may belong to the same code block or different code blocks. When the number of transmitting antennas of the receiver is greater than 1, the data streams corresponding to all transmitting antennas of the receiver are regarded as the first data stream.

In conclusion, a method, an apparatus, and a system for forming downlink beams simply and effectively in a TDD system are disclosed in an embodiment of the present invention. In order to make maximum use of the precise Partial Channel State Information obtained through reciprocity without feedback information, the first beam is designed according to the MRT criterion, and other beams are confined in the null space of the first beam. In a statistic sense, the beams are selected on the basis of capacity maximization to minimize the interference caused by other beams onto the first beam. In a statistic sense, the accomplishable rate of other beams is ensured. The method involves only simple calculation, avoids complicated operations such as SVD, and avoids feedback of long-term channel statistics from the mobile terminal to the Base Station, which forms a striking contrast compared with the PEB forming method.

Persons of ordinary skilled in the art should understand that all or part of the steps of the method under the present disclosure may be implemented by a program instructing relevant hardware. The program may be stored in a computer readable storage medium. When the program runs, the steps of the method under the present disclosure are performed. The storage media may be a magnetic disk, CD-ROM, Read-Only Memory (ROM), or Random Access Memory (RAM).

Although the invention has been described through some exemplary embodiments, the inventive concepts disclosed herein are not limited to such embodiments. It is apparent that those skilled in the art can make modifications and variations to the embodiments without departing from the spirit and scope of the inventive concepts. The invention is intended to cover the modifications and variations provided that they fall in the scope of protection defined by the following claims or their equivalents.

What is claimed is:

1. A method for forming Time Division Duplex (TDD) Multi-Input Multi-Output (MIMO) downlink beams, the method comprising:
    generating, by a base station, a transmitting beam of a first data stream according to a Maximum Rate Transmission (MRT) criterion; and
    generating, by the base station, transmitting beams of other data streams except the first data stream, wherein the transmitting beams of the other data streams are confined in a null space of the transmitting beam of the first data stream, wherein the MRT comprises a maximum Signal-to-Noise Ratio (SNR) of the first data stream.

2. The method for forming TDD MIMO downlink beams according to claim 1, comprising:
    maximizing an accomplishable rate of the other data streams.

3. The method for forming TDD MIMO downlink beams according to claim 1, wherein:
    the first data stream is corresponding to a transmitting antenna of a mobile terminal, and other data streams except the first data stream are corresponding to a non-transmitting antenna of the mobile terminal.

4. The method for forming TDD MIMO downlink beams according to claim 3, wherein:
    the first data stream and other data streams except the first data stream belong to the same code block or different code blocks.

5. The method for forming TDD MIMO downlink beams according to claim 3, wherein:
    if the number of the transmitting antennas of the mobile terminal is greater than 1, the data streams corresponding to all transmitting antennas of the mobile terminal are regarded as the first data stream.

6. A Base Station, comprising:
    a first-data stream transmitting beam generating unit, configured to generate a transmitting beam of a first data stream according to a Maximum Rate Transmission (MRT) criterion; and
    an other-data stream transmitting beam generating unit, configured to generate transmitting beams of other data streams except the first data stream, wherein the transmitting beams of the other data streams are confined in a null space of the transmitting beam of the first data stream,
    wherein the MRT comprises a maximum Signal-to-Noise Ratio (SNR) of the first data stream.

7. The Base Station of claim 6, wherein:
    the other-data stream transmitting beam generating unit is further configured to maximize an accomplishable rate of the other data streams.

8. The Base Station of claim 6, wherein:
    if the number of the transmitting antennas of the mobile terminal is greater than 1, the data streams corresponding to all transmitting antennas of the mobile terminal are regarded as the first data stream.

9. A communications system, comprising:
    a Base Station configured to: generate a transmitting beam of a first data stream according to a Maximum Rate Transmission (MRT) criterion, and generate transmitting beams of other data streams except the first data stream, wherein the transmitting beams of other data streams are confined in a null space of the transmitting beam of the first data stream; and
    a receiver, configured to receive the transmitting beam of the first data stream and the transmitting beams of the other data streams except the first data stream from the Base Station,
    wherein the MRT comprises a maximum Signal-to-Noise Ratio (SNR) of the first data stream.

10. The communications system of claim 9, wherein:
    the receiver is a Minimum Mean Square Error (MMSE) receiver.

* * * * *